United States Patent [19]

Dieterich

[11] 4,201,852

[45] May 6, 1980

[54] POLYURETHANES BASED ON MODIFIED POLYISOCYANATES CONTAINING SULPHONIC ACID ESTER GROUPS AND PROCESS FOR THE PRODUCTION THEREOF

[75] Inventor: Dieter Dieterich, Leverkusen, Fed. Rep. of Germany

[73] Assignee: Bayer Aktiengesellschaft, Leverkusen, Fed. Rep. of Germany

[21] Appl. No.: 848,068

[22] Filed: Nov. 3, 1977

[30] Foreign Application Priority Data

Nov. 9, 1976 [DE] Fed. Rep. of Germany ....... 2651065

[51] Int. Cl.$^2$ .................... C07C 143/68; C08G 18/77; C08G 18/79
[52] U.S. Cl. ................... 528/67; 260/456 B; 528/73
[58] Field of Search ..... 260/75 TN, 75 NT, 77.5 AT, 260/77.5 R, 456 P; 528/73, 67

[56] References Cited

U.S. PATENT DOCUMENTS

| B 414,266 | 2/1976 | Carlson . | |
|---|---|---|---|
| 3,454,606 | 7/1969 | Brotherton et al. | 266/77.5 AT |
| 3,826,769 | 7/1974 | Carlson | 260/77.5 AT |
| 3,875,190 | 4/1975 | Habermeier | 260/77.5 R |
| 3,959,329 | 5/1976 | Dieterich et al. | 260/77.5 AT |
| 3,993,614 | 11/1976 | Carlson | 260/77.5 AT |
| 3,998,870 | 12/1976 | Carlson | 260/75 TN |
| 3,998,871 | 12/1976 | Carlson | 260/453 AR |
| 4,013,701 | 3/1977 | Jabs et al. | 260/453 AR |

*Primary Examiner*—H. S. Cockeram
*Attorney, Agent, or Firm*—Gene Harsh; Joseph C. Gil

[57] ABSTRACT

The instant invention is directed to novel modified polyisocyanates which contain sulphonic acid ester groups and to the method of manufacture thereof. The polyisocyanates of the instant invention are produced by reacting isocyanatoaryl sulphonic acids with oxiranes and/or oxetanes. The resultant products are highly useful in the production of polyurethane resins.

10 Claims, No Drawings

POLYURETHANES BASED ON MODIFIED POLYISOCYANATES CONTAINING SULPHONIC ACID ESTER GROUPS AND PROCESS FOR THE PRODUCTION THEREOF

BACKGROUND OF THE INVENTION

Sulphonic acids of aromatic diisocyanates or polyisocyanates are known (see, e.g., German Offenlegungsschriften Nos. 2,227,111 and 2,359,615 and U.S. Pat. No. 3,826,769). They may be readily obtained by reacting the corresponding aromatic diisocyanates or polyisocyanates with sulphonating agents, such as sulphur trioxide, adducts of sulphur trioxide, oleum, chlorosulphonic acid or sulphuric acid. The products obtained may be solid, resinous or pulverulent sulphonation products, or solutions or dispersions of the sulphonated isocyanates in unreacted starting material, depending on the isocyanate used and the degree of sulphonation and nature of the sulphonating agent.

The preparation of polyurethanes or polyurethane ureas from polyisocyanates containing sulphonic acid groups has been described, for example, in U.S. Pat. No. 3,826,769 and in German Offenlegungsschrift No. 2,359,611. Polyurethanes and polyureas which have been modified with sulphonic acid or sulphonate groups in this way are frequently very hydrophilic. For this reason, the sulphonic acid group content is generally kept as low as possible. Partially sulphonated polyisocyanates or solutions of isocyanato sulphonic acids in polyisocyanates are therefore of particular importance. The major advantage of sulphonated polyisocyanates relates to the high polarity of sulphonic acid groups. This high polarity results in marked interaction or adhesion in polar media, such as water, or with moist polar substrates, and particularly those of an inorganic nature.

On the other hand, chemically pure and especially sulphonated isocyanato sulphonic acids have high melting points, low solubility in organic media and extreme sensitivity to water and atmospheric moisture. These properties render the products difficult to process. The acid character thereof is also frequently a disadvantage. Discoloration and premature degradation of polyurethanes prepared from these compounds make the products difficult to use in practice. Although these phenomena may be prevented by suitable methods of neutralization, the hydrophilic character of the products is thereby increased.

There is therefore a demand for polyisocyanates which would combine the polar character and its attendant advantages, such as low vapor pressure and improved bonding properties, with a predominantly hydrophobic character. There is also a demand for readily accessible aromatic polyisocyanates which would give rise to toxicologically harmless products when the oligomers and polymers produced from them are degraded by hydrolysis.

DESCRIPTION OF THE INVENTION

It has now surprisingly been found that when aromatic polyisocyanato sulphonic acids are reacted with oxiranes or oxetanes novel aromatic polyisocyanates of increased molecular weight are obtained which are characterized by the presence of sulphonic acid ester groups.

The new polyisocyanates according to the present invention have numerous advantageous properties compared with the previously known polyisocyanates:

(1) They have a highly polar character and exceptionally low vapor pressure. They are eminently compatible with numerous polar and apolar media and reactants.

(2) The hydrophilic character of the products may be controlled within wide limits by the chemical nature and quantity of the oxirane or oxetane used. Hydrophobic polyisocyanates are obtained when the sulphonic acid groups are completely reacted with oxiranes or oxetanes.

(3) Hydrolytic degradation of the products results in toxicologically harmless polyamino sulphonic acids.

(4) The functionality of the polyisocyanates according to the present invention may be increased by the reaction. In particular, by following the present invention, higher functional polyisocyanates having a low vapor pressure can be obtained from bifunctional isocyanates.

(5) When the polyisocyanates according to the present invention are used, for example, for the preparation of polyurethanes, polymers having improved fire resistant characteristics are obtained.

It is surprisingly found that mono-oxiranes and mono-oxetanes react at least partly as bifunctional compounds with isocyanato sulphonic acids. It is assumed that a rapid reaction first takes place in which the oxirane or oxetane ring is opened by the sulphonic acid group and a hydroxyl group is formed which in turn reacts more slowly with an isocyanate group. The reaction therefore not only modifies the sulphonic acid group to a hydrophobic sulphonic acid ester group, but at the same time leads to chain-lengthening or chain-linking through an aryl sulphonic acid urethane alkyl ester group. It is only when tetra-substituted oxiranes, such as tetraethyl ethylene oxide, are used that the reaction may be assumed to stop at the stage of a hydroxy alkyl ester.

The present invention thus relates to a process for the preparation of modified polyisocyanates containing sulphonic acid alkyl ester groups, in which the isocyanate groups can be present at least partly in dimerized form, characterized in that isocyanato aryl sulphonic acids which contain at least two isocyanate groups and in which the isocyanate groups may be at least partly in dimerized form, are reacted with oxiranes and/or oxetanes at temperatures of from 0° to 190° C., optionally in the presence of monoisocyanates and/or polyisocyanates which are free from sulphonic acid groups, the nature and quantitative proportions of the reactants being chosen so that the equivalent ratio of the total quantity of isocyanate groups, including those which may be in dimerized form, to the quantity of sulphonic acid groups is greater than 1 and the equivalent ratio of oxirane and oxetane groups to sulphonic acid groups is from 0.1:1 to 10:1.

The present invention also relates to the preferred modified polyisocyanates obtainable by the process according to the present invention, which modified polyisocyanates:

(a) contain from about 4 to about 48% by weight of isocyanate groups, optionally partly in dimerized form;

(b) contain from about 0.3 to about 38% by weight of groups of the formula $-SO_2-O-$ forming a constituent of an aryl sulphonic acid alkyl ester group;

(c) contain from 0 to about 36% by weight of $SO_3H$ groups;

(d) contain from 0 to about 25% by weight of urethane groups ‹NH—CO—O›; and (e) contain from 0 to about 28% by weight of allophanate groups $$\text{-(NH-CO-}\overset{|}{\text{N}}\text{-CO-O)-;}$$

wherein the groups mentioned under (d) and (e) together amount to from 0.4% by weight to not more than about 28% by weight, and wherein the groups mentioned under (b) and (c) together amount to no more than about 38%, by weight.

Furthermore, the present invention relates to the use of modified polyisocyanates obtainable by the process according to the present invention as starting materials for the production of oligomeric or polymeric polyaddition products.

In carrying out the process according to the present invention, addition of the oxirane or oxetane to the sulphonic acid group of the aromatic isocyanato sulphonic acid to form isocyanato aryl sulphonic acid hydroxy alkyl esters or, for example when using cycloaliphatic epoxides, to form isocyanato aryl sulphonic acid hydroxy cycloalkyl esters, takes place in the first stage of the reaction. Thus, for example, diisocyanato benzene sulphonic acid (I) is reacted with ethylene oxide or trimethylene oxide (II) in the first reaction stage of the process according to the present invention to form the corresponding diisocyanato benzene sulphonic acid hydroxy alkyl ester (III):

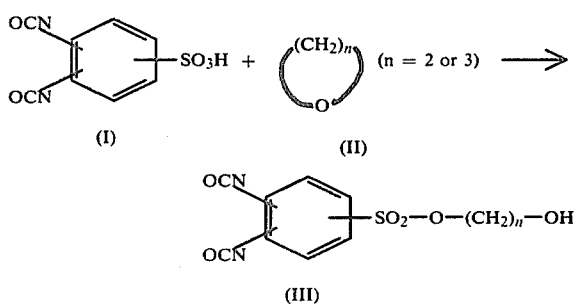

When sub-equivalent quantities of oxiranes or oxetanes are used, mixtures containing unreacted isocyanato aryl sulphonic acid are obtained from the first reaction stage of the process according to the present invention.

If the hydroxyl group formed in the first reaction stage is not prevented from further reaction, for example by steric hindrance, the second reaction stage leads to the formation of compounds containing isocyanate groups, sulphonic acid alkyl ester groups and urethane groups. Thus, for example, the above intermediate product (III) may undergo a chain-lengthening reaction on its own to form compounds of increased molecular weight corresponding to the following formula (IV):

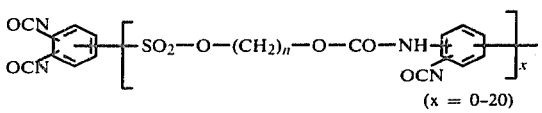

$(x = 0\text{-}20)$ (IV)

Any isocyanates present in the reaction mixture which are free from hydroxyl groups (either isocyanato aryl sulphonic acids which have not yet taken part in the reaction or mono- or poly-isocyanates free from sulphonic acid groups) cause chain-termination with formation of end groups corresponding to the following formula (V):

$$-SO_2-O-(-CH_2)_n-O-CO-NH-R \qquad (V)$$

wherein R represents a group obtainable by removal of an isocyanate group from a mono- or poly-isocyanate which is free from hydroxyl groups.

It will readily be seen that the value of the index x depends on the nature and quantitative proportions of the starting materials used. Thus, when polyisocyanato aryl sulphonic acids are used as the only isocyanate components together with equivalent or excess quantities of oxiranes or oxetanes, compounds having an increased molecular weight are obtained during the second stage of the process according to the present invention, whereas the use of sub-equivalent quantities of oxiranes or oxetanes and/or the presence of mono- or poly-isocyanates which are free from sulphonic acid groups results in the formation of comparatively low molecular weight compounds in which x may even be 0.

Depending on the reactivity of the isocyanates used as starting material and on the reaction conditions, particularly on the reaction temperature, derivatives containing allophanate groups may also be formed in a possible third reaction stage of the process according to the present invention by addition of isocyanate groups to the urethane groups. Another possible embodiment of the process according to the present invention involves using higher functional oxiranes or oxetanes, i.e. compounds containing more than 1 oxirane or oxetane group. The products then obtained in accordance with the reaction scheme exemplified above are branched products since, for example, 2 mol of a monosulphonic acid would react with 1 mol of a bis-oxetane in the first reaction stage to form a derivative containing two hydroxyalkyl groups, which would then react to form highly branched derivatives. It is thus apparent that when carrying out the process according to the present invention, the molecular size and degree of branching and hence the viscosity and isocyanate functionality of the products according to the present invention may easily be adjusted by suitable choice of the starting materials, the proportions in which they are used and the reaction conditions, i.e., in particular, the reaction temperature (allophanate formation). This is true particularly in view of the fact that, instead of the starting materials exemplified above, any of the starting materials exemplified below may be used, i.e., in particular, isocyanato aryl sulphonic acids, oxiranes, oxetanes and mono- or poly-isocyanates which are free from sulphonic acid groups.

The process according to the present invention therefore preferably yields modified polyisocyanates which, in addition to isocyanate groups and sulphonic acid alkyl ester groups, may also contain free sulphonic acid groups, as well as urethane groups and/or allophanate groups. It is only when sterically hindered oxiranes or oxetanes are used that the process according to the present invention results in modified polyisocyanates which contain no urethane and allophanate groups. Since the isocyanato aryl sulphonic acids used as starting materials are often present at least in a partly dimerized form (uretdiones) the modified polyisocyanates according to the present invention also include compounds in which the isocyanate groups may be at least partly dimerized.

The preferred modified polyisocyanates obtainable by the process according to the present invention are characterized as:

(a) containing from about 4 to about 48%, by weight, preferably from about 10 to about 40%, by weight, of isocyanate groups, optionally in dimerized form;

(b) containing from about 0.3 to about 38%, by weight, preferably from about 0.6 to about 28% by weight of groups of the formula —SO₂—O—;

(c) containing from 0 to about 36% by weight and preferably from 0 to about 10%, by weight, of sulphonic acid groups SO₃H;

(d) containing from 0 to about 25%, by weight, preferably from about 0.2 to about 20%, by weight, of urethane groups —NH—CO—O—; and (e) containing from 0 to about 28%, by weight preferably from about 0.2 to about 20%, by weight, of allophanate groups

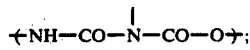

wherein the total quantity of groups mentioned under (d) and (e) is from about 0.4%, by weight, and to not more than about 28%, by weight, and the groups mentioned under (b) and (c) together amount to not more than 38%, by weight.

Sulphonation products of any known aromatic polyisocyanate may be used as the isocyanato aryl sulphonic acids in the process according to the present invention. The following are examples of such aromatic polyisocyanates which may be used in the form of the sulphonation products thereof in the process according to the present invention: 4,4'-stilbene diisocyanate; 4,4'-dibenzyl diisocyanate; 3,3'- and 2,2'-dimethyl-4,4'-diisocyanato-diphenyl methane; 2,5,2',5'-tetramethyl-4,4'-diisocyanato-diphenyl methane; 3,3'-dimethoxy-4,4'-diisocyanato-diphenyl methane; 3,3'-dichloro-4,4'-diisocyanato-diphenyl methane; 4,4'-diisocyanato-diphenyl cyclohexyl methane; 4,4'-diisocyanato-benzophenone; 4,4'-diisocyanato-diphenyl sulphone; 4,4'-diisocyanato-diphenyl ether; 4,4'-diisocyanato-3,3'-dibromo-diphenyl methane; 4,4'-diisocyanato-3,3'-diethyl-diphenyl methane; 4,4'-diisocyanato-diphenyl-ethylene-(1,2); 4,4'-diisocyanato-diphenyl sulphide; 1,3- and 1,4-phenylene diisocyanato; 2,4- and 2,6-tolylene diisocyanate and mixtures of these isomers; diphenyl methane-2,4'- and/or -4,4'-diisocyanate; naphthylene-1,5-diisocyanate; triphenyl methane-4,4',4"-triisocyanate; polyphenyl-polymethylene polyisocyanates, which are obtainable by aniline-formaldehyde condensation followed by phosgenation as described, for example, in British Pat. Nos. 874,430 and 848,671; polyisocyanates containing carbodiimide groups as described in German Pat. No. 1,092,007; the diisocyanates described in U.S. Pat. No. 3,492,330; polyisocyanates containing allophanate groups as described, for example, in British Pat. No. 994,890, Belgian Pat. No. 761,626 and published Dutch Patent application 7,102,524; polyisocyanates containing isocyanurate groups as described, e.g., in German Pat. Nos. 1,022,789; 1,222,067 and 1,027,394 and in German Offenlegungsschriften Nos. 1,929,034 and 2,004,048; polyisocyanates containing acylated urea groups as described in German Pat. No. 1,230,778; polyisocyanates containing biuret groups, e.g. as described in German Pat. No. 1,101,394, British Pat. No. 889,050 and French Pat. No. 7,017,514; and the like. The distillation residues obtained from the commercial production of isocyanates which still contain isocyanate groups may also be used, optionally in the form of solutions in one or more of the above-mentioned polyisocyanates. Mixtures of the above-mentioned polyisocyanates may also be used.

Phosgenation products of condensates of aniline and aldehydes or ketones, such as acetaldehyde, propionaldehyde, butyraldehyde, acetone or methyl ethyl ketone, are also suitable. The phosgenation products of condensates of anilines which are alkyl substituted in the nucleus may also be used, in particular of condensates of toluidines with aldehydes or ketones, such as formaldehyde, acetaldehyde, butyraldehyde, acetone or methyl ethyl ketone.

Reaction products of the above-mentioned aromatic polyisocyanate mixtures containing from 0.2 to 50 mol % of polyols may also be used, provided that the viscosity of the reaction products obtained does not exceed 50,000 cP at 25° C. and the isocyanate content thereof is at least 6%, by weight. Suitable polyols for modifying the starting materials include, in particular, the polyether and/or polyester polyols generally known in polyurethane chemistry which have molecular weights of from 200 to 6,000, preferably from 300 to 4,000, and low molecular weight polyols having molecular weights of from 62 to 200. Ethylene glycol, propylene glycol, glycerol, trimethylol propane and 1,4,6-hexane triol are examples of such low molecular weight polyols.

Particularly preferred isocyanato aryl sulphonic acids are the sulphonation products of 2,4-tolylene diisocyanate and of mixtures of 2,4- and 2,6-tolylene diisocyanate, and the sulphonation products of diisocyanates or polyisocyanates obtained by the phosgenation of aniline/formaldehyde condensates. These mixtures contain, in particular, 4,4'-diisocyanato diphenyl methane and 2,4'-diisocyanato diphenyl methane and higher nuclear homologues of these products.

It is immaterial in principle what sulphonating agents are used for preparing the isocyanato aryl sulphonic acids. Suitable sulphonating agents include, for example, sulphur trioxide, oleum, sulphuric acid or adducts of sulphur trioxide with Lewis bases which contain oxygen, nitrogen or phosphorus atoms. Other known sulphonating agents may also be used such as chlorosulphonic acid, acyl sulphates, such as acetyl sulphate, or reaction products of said anhydrides with sulphuric acid or oleum. Side reactions, for example, the formation of urea or biuret groups or the partial conversion of isocyanate groups into carbamic acid chloride groups or acylamide groups, are generally of no importance, particularly when preparing only partially sulphonated isocyanates, so that sulphonating agents, such as sulphuric acid, chlorosulphonic acid or acetyl sulphate, may quite well be used in such cases. For preparing highly sulphonated polyisocyanates, on the other hand, it is preferred to use sulphur trioxide or adducts thereof, for example as described in German Offenlegungsschrift No. 2,510,693. It is also preferred to use aromatic polyisocyanato sulphonic acids based on tolylene diisocyanate or diphenyl methane diisocyanate which contain urea or biuret groups.

Solutions and dispersions of isocyanato aryl sulphonic acids in unsulphonated liquid polyisocyanates are particularly preferred. These products may be obtained, for example, by partial sulphonation of aromatic polyisocyanates. Partial sulphonation of chemically uniform diisocyanates or of binary isomeric mixtures generally results in suspensions, whereas partial sulphonation of multi-component mixtures generally results in homogeneous solutions. For the process according to the present invention, it is immaterial in principle whether solutions or suspensions are used. Partially sulphonated polyisocyanate mixtures of the type obtained by phosgenating aniline/formaldehyde condensates as described in German Offenlegungsschriften Nos. 2,227,111; 2,359,614 and 2,359,615 are particularly preferred. Suspensions of diisocyanato toluene sulphonic acid dimers and of diisocyanato diphenyl methane sulphonic acid dimers in diisocyanato toluene or diisocyanato diphenyl methane are also particularly preferred.

The isocyanato aryl sulphonic acids used for the process according to the present invention, or mixtures thereof with unsulphonated aromatic polyisocyanates, may be prepared by known processes or by analagous processes, for example as described in the references mentioned above or in U.S. Pat. No. 3,826,769. The processes according to German Offenlegungsschrifts Nos. 25 24 476 or 25 15 876 corresponding to U.S. Pat. Application No. 690 494 of May 27, 1976 and 782 642 of Mar. 30, 1977 are also suitable for preparing the isocyanato aryl sulphonic acids used in the process according to the present invention.

The process according to the present invention may also be carried out using solutions or suspensions of the exemplified isocyanato aryl sulphonic acids in aliphatic polyisocyanates, such as tetramethylene diisocyanate or hexamethylene diisocyanate, and/or in cycloaliphatic or mixed aliphatic-cycloaliphatic polyisocyanates, such as 4,4'-diisocyanato dicyclohexyl methane, 2,4- or 2,6-diisocyanato-hexahydro-toluene or 1-isocyanato-3,3,5-trimethyl-5-isocyanato-methyl cyclohexane. If it is desired to lower the isocyanate functionality of the products obtained by the process according to the present invention, solutions or suspensions of the isocyanato aryl sulphonic acids in aromatic, aliphatic or cycloaliphatic monoisocyanates may be used. Examples of the last-mentioned compounds include: phenyl isocyanate, tolylisocyanate, n-hexylisocyanate, 6-chloro-hexylisocyanate, cyclohexyl isocyanate and methoxymethyl isocyanate. In principle, it is also possible to use sulphonated aromatic monoisocyanates, such as phenyl isocyanate, and isocyanato aryl sulphonic acids in combination with unsulphonated polyisocyanates of the exemplified type. The nature and quantitative proportions of the isocyanates used in the process according to the present invention and the degree of sulphonation are chosen so that the equivalent ratio of isocyanate groups present (optionally partly in dimerized form) and sulphonic acid groups is greater than 1:1, in particular from 1.05:1 to 50:1, and most preferably from 2:1 to 30:1.

The oxiranes used in the process according to the present invention may be essentially any organic compound which has at least one epoxide group and may in addition be substituted with isocyanate or hydroxyl groups and is otherwise substantially inert under the reaction conditions employed for oxirane-sulphonic acid addition. Mono-epoxides having molecular weights of from 44 to 400 conforming to this definition are preferably used in the process according to the present invention. Examples of suitable mono-epoxides include: ethylene oxide, propylene oxide, butene-1,2-oxide, butene-2,3-oxide, 1,4-dichloro-butene-2,3-oxide, styrene oxide, 1,1,1-trichloropropene-2,3-oxide, 1,1,1-trichlorobutene-3,4-oxide, 1,4-dibromobutene-2,3-oxide, epichlorohydrin, epibromohydrin, glycidyl ether, glycerol monoglycidyl ether, isobutene oxide, p-glycidyl styrene, N-glycidyl carbazole, cyanoethyl glycidyl ether, trichloroethyl glycidyl ether, chloroethyl glycidyl ether, bromoethyl glycidyl ether, vinyl oxirane, 2-(1,2-dichloroethyl-) oxirane, 2-(1-chlorovinyl-) oxirane, 2-chloro-2-vinyl-oxirane, 2,3-epoxipropyl phosphonic acid diethyl ester, 2-methyl-2-vinyl-oxirane, 2-(1-methylvinyl)-oxirane and the like.

Esters of glycidol with monocarboxylic acids are also suitable, for example glycidyl acetate, glycidyl chloroacetate, glycidyl dichloroacetate, glycidyl trichloroacetate, glycidyl bromoacetate, glycidyl acrylate, glycidyl methacrylate, glycidyl caproate, glycidyl octoate, glycidyl dodecanoate, glycidyl oleate or glycidyl stearate, as well as ethers of glycidol, for example with phenol and substituted phenols, in particular halogenated phenols. Reaction products of hydroxy oxiranes are also suitable, in particular the reaction products of glycidol with aliphatic, cycloaliphatic and aromatic mono- and polyisocyanates. Di- and poly-epoxides, either alone or in combination with mono-epoxides as mentioned above, may be used to increase the density of cross-linkages. Examples of these difunctional and polyfunctional epoxides include: the epoxidation products of aliphatic and cycloaliphatic diolefins, such as diepoxy butane, diepoxy hexane, vinyl cyclohexene dioxide, dicyclopentadiene dioxide, limonene dioxide, dicyclopentadiene dioxide, ethylene glycol-bis-(3,4-epoxy tetrahydro-dicyclopentadien-8-yl)-ether, (3,4-epoxy tetrahydro dicyclopentadien-8-yl)-glycidyl ether; epoxidized polybutadienes or copolymers of butadiene with ethylenically unsaturated compounds, such as styrene or vinyl acetate; compounds having two epoxy cyclohexyl radicals, such as diethylene glycol-bis-(3,3-epoxy cyclohexane carboxylate), bis-3,4-(epoxy cyclohexyl methyl)-succinate, 3,4-epoxy-6-methylcyclohexylmethyl-3',4'-epoxy-6'-methyl-cyclohexane-carboxylate and 3,4-epoxy hexahydrobenzal-3',4'-epoxy cyclohexane-1',1'-dimethanol; and the like.

Other materials which may suitably be used according to the present invention include polyglycidyl esters such as those obtainable by reacting a dicarboxylic acid or reacting cyanuric acid with epichlorohydrin or dichlorohydrin in the presence of an alkali. Polyesters of this type may be derived from aliphatic dicarboxylic acids, such as succinic or adipic acid, and, in particular, from aromatic dicarboxylic acids, such as phthalic acid or terephthalic acid. Diglycidyl adipate, diglycidyl phthalate and triglycidyl isocyanurate may also be mentioned in this connection.

Diglycidyl ethers, such as those obtained by etherification of a dihydric or higher hydric alcohol or of a diphenol or polyphenol with epichlorohydrin or dichlorohydrin in the presence of an alkali are preferably used. These compounds may be obtained from glycols, and higher hydric alcohols such as ethylene glycol, diethylene glycol, triethylene glycol, 1,3-propylene glycol, 1,4-butane diol, 1,5-pentane diol, 1,6-hexane diol, 2,4,6-hexane triol, and glycerol; diphenols or polyphenols, such as resorcinol, pyrocatechol, hydroquinone; phenol phthalein; phenolformaldehyde condensation products, such as novolaks; 1,4-di-hydroxynaphthalene; dihydroxy-1,5-naphthalene; bis-(hydroxy-4-phenyl)-methane; tetrahydroxyphenyl-1,1,2,2-ethane, bis-(hydroxy-4-phenyl)-methylphenyl methane; the bis-(hydroxy-4-phenyl)-tolyl methanes; dihydroxy-4,4'-diphenyl; bis-(hydroxy-4-phenyl) sulphone; and, in particular, bis-(hydroxy-4-phenyl)-2,2-propane or the condensation products of a phenol with an aldehyde or ketone. The products obtained in the last mentioned case are epoxy resins having two or more epoxy groups and optionally free hydroxyl groups. Particularly suitable among these products are the epoxy resins prepared from polyphenols which are known under the trade name NOVOLAK resins and which are polycondensation products of a phenol with formaldehyde. The epoxy resins obtained correspond to the following formula:

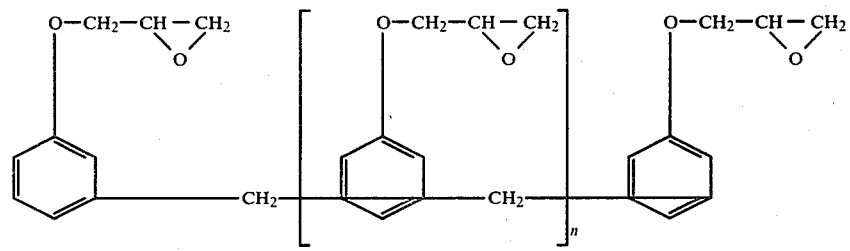

Polyglycidyl ethers of diphenols which have been obtained by esterification of 2 mol of the sodium salt of an aromatic hydroxy carboxylic acid with 1 mol of a dihalogen alkane or dihalogen dialkyl ether (see British Pat. No. 1,017,612) or polyglycidyl ethers of polyphenols obtained by the condensation of phenols with long-chain halogenated paraffins containing at least two halogen atoms (see British Pat. No. 1,024,288) are also suitable. The following may also be used: polyepoxide compounds based on aromatic amines and epichlorohydrin, such as, for example, N-di-(2,3-epoxy propyl)-aniline, N,N'-dimethyl-N,N'-diepoxy propyl-4,4'-diamino diphenylmethane, N,N'-tetra epoxy propyl-4,4'-diamino diphenylmethane and N-diepoxy propyl-4-aminophenyl-glycidyl ether (see British Pat. Nos. 772,830 and 816,923). The following may also be used: glycidyl esters of higher functional aromatic and cycloaliphatic carboxylic acids, for example phthalic acid diglycidyl ester containing more than 5.5 epoxide equivalents per kg and glycidyl esters of reaction products of 1 mol of an aromatic or cycloaliphatic dicarboxylic acid anhydride and ½ mol of a diol or 1/n mol of a polyol containing n-hydroxyl groups or hexahydrophthalic acid diglycidyl ester, which esters may be substituted by methyl groups. Other examples include: glycidyl compounds based on inorganic acids, e.g. triglycidyl phosphate, glycidyl ethers of hydroxy phenyl phosphoric acid esters, diglycidyl carbonate and tetraglycidyl titanate.

Cycloaliphatic epoxide compounds are also suitable, and include, for example, the compounds corresponding to the following formulae:

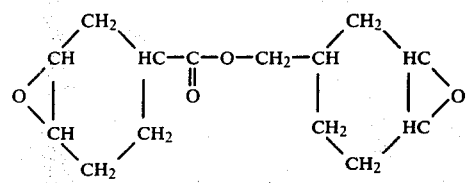

(=3,4-epoxycyclohexylmethyl-3',4'-epoxycyclohexane carboxylate),

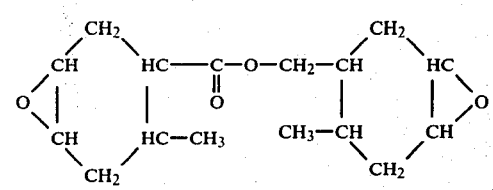

(=3,4-epoxy-6-methylcyclohexylmethyl-3',4'-epoxy-6'-methyl-cyclohexane carboxylate) and

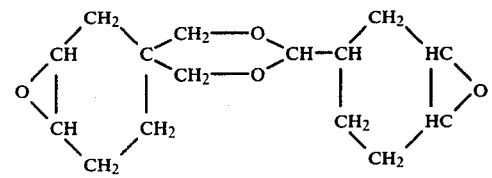

(=3,4-epoxyhexahydrobenzal-3',4'-epoxycyclohexane 1',1'-dimethanol). Suitable heterocyclic epoxide compounds also include triglycidyl isocyanurate corresponding to the following formula:

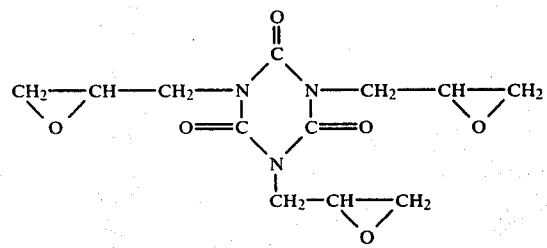

and N,N'-diglycidyl-dimethyl hydantoin corresponding to the following formula:

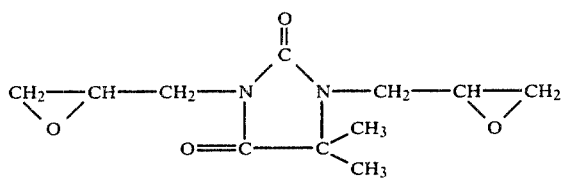

Mixtures of such cycloaliphatic and/or heterocyclic epoxide compounds may also be used.

Other suitable compounds include the polyglycidyl ethers of bis-(p-hydroxyphenyl)-dimethyl methane (bisphenol (A) represented by the following average formula:

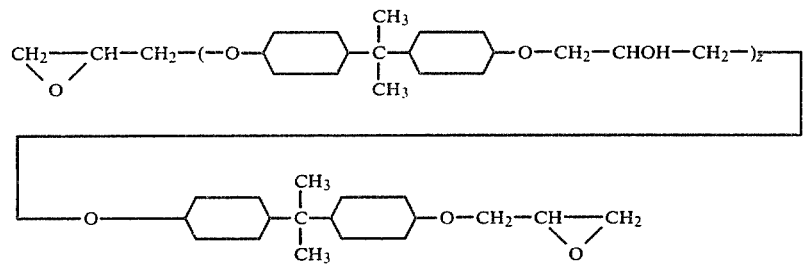

wherein z represents a whole number or fraction of from 0 to 2.

The following are further examples of suitable diepoxides: glycerol-diglycidyl ether, diglycidyl-N,N'-ethylene urea, diglycidyl-N,N'-propylene urea, N,N'-diglycidyl-urea, N,N'-diglycidyl-dimethyl urea and oligomers of these compounds, di-, tri- and tetra-glycidyl-acetylene-diurea and oligomers of these compounds. Other epoxides suitable for the purposes of the present invention are known and are described, for example, in Houben-Weyl, published by Eugen Müller, 1963, Volume XIV/2, pages 462–538.

The epoxidation products of natural fats and oils, such as soya bean oil, olive oil, linseed oil or train oil, or of synthetic di- or poly-esters containing unsaturated fatty acids, such as oleic acid, linoleic acid, linolenic acid, ricinoleic acid or erucic acid, are also suitable.

Hydrophobic, water-insoluble or liquid mono- and polyepoxides are particularly suitable, for example polyglycidyl ethers of polyfunctional phenols, in particular of bisphenol A; polyepoxide compounds based on aromatic amines, in particular bis-(N-epoxypropyl)-aniline, N,N'-dimethyl-N,N'-diepoxypropyl-4,4'-diaminodiphenyl methane and N,N'-diepoxypropyl-4-aminophenyl glycidyl ether; polyglycidyl esters of aromatic or cycloaliphatic dicarboxylic acids, in particular hexahydrophthalic acid diglycidyl ester or phthalic acid diglycidyl ester containing more than 5.5 epoxide equivalents per kg, and phosphoric acid triglycidyl ester.

A summary of technologically important polyoxiranes may be found in H. Batzer and F. Lohse: Einführung in die makromolekulare Chemie, Hüthig & Wepf Verlag Basel, Heidelberg, 1976, p. 44–53.

The oxetanes useful in the process according to the present invention may be essentially any organic compound which contains at least one oxetane ring and may also be substituted by isocyanate or hydroxyl groups, but is otherwise substantially inert under the reaction conditions of oxetane/sulphonic acid addition. Preferred oxetanes conforming to this definition are monooxetanes having molecular weights of from 58 to 400.

The following are examples of suitable mono-oxetanes: trimethylene oxide, 3,3-dimethyl oxetane, 3,3-diethyl oxetane, 3,3-dipropyl oxetane, 3,3-dibutyl oxetane, 3-methyl-3-dodecyl-oxetane, 3-ethyl-3-stearyl-oxetane, 3,3-tetramethylene oxetane, 3,3-pentamethylene oxetane, 2,6-dioxaspiro-(3,3)-heptane, 3-methyl-3-phenoxymethyl-oxetane, 3-ethyl-3-phenoxymethyl-oxetane, 3-methyl-3-chloromethyl-oxetane, 3-ethyl-3-chloromethyl-oxetane, 3-butyl-3-chloromethyl-oxetane, 3-dodecyl-3-chloromethyl-oxetane, 3-stearyl-3-chloromethyl-oxetane, 3-methyl-3-bromomethyl-oxetane, 3-ethyl-3-bromomethyl-oxetane, 3-propyl-3-bromomethyl-oxetane, 3-dodecyl-3-bromomethyl-oxetane, 3,3-bis-chloromethyl-oxetane, 3,3-bis-bromomethyl-oxetane, 3-methyl-3-hydroxymethyl-oxetane, 3-ethyl-3-hydroxymethyl-oxetane, 3-amyl-3-hydroxymethyl-oxetane, 3,3-bis-hydroxymethyl-oxetane; also ethers, esters and urethanes of these hydroxy oxetanes, e.g. 3-ethyl-3-methoxymethyl-oxetane, 3-ethyl-3-butoxymethyl-oxetane, 3-ethyl-3-dodecyoxy methyl-oxetane, 3-ethyl-3-acetoxymethyl-oxetane, 3-ethyl-3-stearoyloxymethyl-oxetane, 3-ethyl-3-N-methyl-carbamoylmethyl-oxetane, 3-ethyl-3-N-chloroethyl-carbamoylmethyl-oxetane, 3-ethyl-3-N-phenylcarbamoylmethyl-oxetane, 3-ethyl-3-N-dichlorophenylcarbamoylmethyl-oxetane, 3-ethyl-3-N-stearylcarbamoylmethyl-oxetane, 3,3-bis-phenoxymethyl-oxetane, 3,3-bis-(4-chlorophenoxymethyl)-oxetane, 3,3-bis-(2,4-dichlorophenoxymethyl)-oxetane, 3,3-bis-(carbamoylmethyl)-oxetane, 3-phenoxymethyl-3-carbamoylmethyl-oxetane, 3-methyl-3-cyano-ethoxymethyl-oxetane, 3-ethyl-3-cyano-ethoxymethyl-oxetane, tris-(3-ethyl-oxetanylmethyl)-phosphite, tris-(3-ethyl-oxetanylmethyl)-phosphate and tris-(3-methyl-oxetanylmethyl)-phosphite. Other suitable oxetanes are described, for example, in German Auslegeschrift No. 1,668 900, columns 3 and 4. The oxetane analogues of the glycidyl derivatives mentioned earlier may, of course, also be used, and include, for example, 3-ethyl-3-acryloxy-oxetane, 3-ethyl-3-methacryloxy-oxetane or 3-methyl-3-trichloroacetoxy-oxetane.

Particularly important among the di- and polyoxetanes which may be used according to the present invention are the reaction products of 3-alkyl-3-hydroxymethyl-oxetanes with di- and poly-carboxylic acids and with di- and poly-isocyanates. Di- and poly-ethers of hydroxy oxetanes derived from aliphatic, cycloaliphatic and aromatic diols and polyols are also very suitable. Since the hydroxyl group formed by the reaction of the oxetanes with sulphonic acid groups is less sterically hindered, oxetanes in most cases react more rapidly as bifunctional compounds than the corresponding oxiranes.

Oxiranes are preferred to oxetanes as starting materials for the process according to the present invention. Ethylene oxide, propylene oxide, styrene oxide, 1,1,1-trichlorobutene-3,4-oxide and epichlorohydrin are the presently preferred oxiranes.

The oxiranes and oxetanes used in the process according to the present invention and the quantities in which they are used are chosen so that the equivalent ratio of epoxide or oxetane groups to sulphonic acid groups is from 0.1:1 to 10:1, and preferably from 0.6:1 to 2:1. When the equivalent ratio is less than 1:1, the $SO_3H$-groups present are only partly esterified so that the products obtained according to the present invention still have free sulphonic acid groups which impart a hydrophilic character to the products. The hydrophilic character of the products according to the present invention may therefore be varied by varying the aforesaid equivalent ratio within the range of from 0.1:1 to 1:1. The epoxide or oxetane component may, of course, be used in excess, for example to ensure quantitative esterification of the sulphonic acid groups when mono-epoxides or mono-oxetanes are used, or in order to incorporate free epoxide or oxetane groups into the products according to the present invention by using compounds containing more than one epoxide or oxetane group. Epoxide groups incorporated in this way may be used in particular for secondary reactions such as trimerization of the isocyanate groups, oxazolidone formation or amine cross-linking. On the other hand, it must be remembered that the presence of free epoxide groups may impair the long-term storage stability of the products according to the present invention. If an excess of mono-epoxide or mono-oxetane has been used, it may be removed from the product according to the present invention by distillation after completion of the process according to the present invention.

The process according to the present invention is very simple and is generally carried out at temperatures of from 0° to 190° C., and preferably from 20° to 140° C.

When a discontinuous process is employed, the polyisocyanate is preferably first introduced into a stirrer vessel at room temperature and the epoxide or oxetane is then stirred in. The reaction generally begins at once with exothermic heating. If the proportion of sulphonic acid groups in the polyisocyanate is more than about 10%, it may be advisable to carry out the reaction at lower temperatures, for example at from 0° to 20° C., possibly with cooling. As a general rule, however, such measures are not necessary since there is no harm in heating the reaction mixture, for example to 140° C. or more. If it is important to obtain a rapid reaction within a short time, for example when using epoxides and oxetanes which are liquid at room temperature or viscous isocyanates, it may be advisable to carry out the reaction at elevated temperatures, for example at from 40° to 140° C., and in certain cases the temperature may be raised to about 190° C.

Gaseous epoxides are suitably introduced into the polyisocyanate with stirring. The reaction is preferably carried out solvent-free although inert solvents may, of course, be employed. Suitable solvents include, for example, dichloroethane, chloroform, tetrachloroethane, trichlorofluoromethane, acetone, toluene or chlorobenzene.

The reaction of solid polyisocyanato sulphonic acids with epoxides poses no problems since the solid sulphonic acids rapidly go into solution during the reaction. The products obtained from the reaction are therefore generally homogeneous liquids or highly viscous to solid resins. Dispersions still containing solid isocyanato sulphonic acid may be obtained if only partial reaction with the epoxide is carried out.

According to a particularly preferred embodiment of the process, solutions of the isocyanato sulphonic acids in organic phosphates are used for the reaction with oxiranes or oxetanes. If desired, organic phosphites, phosphonates and pyrophosphates may be used instead of phosphates. Sulphonation is preferably previously carried out in the presence of the phosphates and this reaction is immediately followed by the reaction according to the present invention. If acid organic phosphates are used or if transesterification reactions between the isocyanato sulphonic acid and phosphate set in after the sulphonation reaction, the OH-group of the phosphate may react with the oxirane or oxetane. This must be taken into account when calculating the proportions of starting materials to be used.

Suitable phosphates, phosphites, phosphonates and pyrophosphates are known and have been described, for example, in German Offenlegungsschrift No. 2,510,693. Tris-(2-chloroethyl)-phosphate is particularly preferred.

It is especially advantageous to carry out the reaction of isocyanatoaryl sulphonic acids with oxiranes or oxetanes immediately after the sulphonation reaction. This method has the particular advantage that isolation of the free isocyanatoaryl sulphonic acids, which are extremely sensitive to moisture, may be avoided. One particularly preferred method of carrying out the process therefore involves sulphonating the polyisocyanate, e.g. tolylene diisocyanate or diisocyanato diphenyl methane, in a solvent, such as chlorobenzene, and then reacting the resulting suspension with an oxirane or oxetane. Since the phosgenating reaction for preparing the polyisocyanate is normally also carried out in an inert solvent, such as chlorobenzene, the reactions of phosgenation, sulphonation and esterification may be carried out directly one after the other without isolation of intermediate stages. The products of the process according to the present invention are in this way obtained directly from the corresponding amine as solutions or dispersions in the solvent used.

If less than about 50% of the polyisocyanate is to be sulphonated or esterified, the process may be carried out without organic solvents. Sulphonation in that case results in a suspension of the sulphonated polyisocyanate in unchanged starting isocyanate. The suspended solid phase generally goes into solution during the reaction with the oxirane or oxetane and a solution of the sulphonic acid ester in the starting isocyanate is obtained. Due to the high proportion of isocyanate groups to $SO_3H$ groups, the molecular weight of the isocyanatoaryl sulphonic acid ester is in this case lower than that obtained by complete sulphonation of the polyisocyanate. The solvent-free method may be used, for example, for obtaining viscous solutions of tolylene diisocyanate modified with sulphonic acid ester groups. These solutions may be used as such instead of unmodified tolylene diisocyanate or, if desired, the free tolylene diisocyanate may be distilled off and the resinous sulphonic acid ester isocyanate isolated. The latter may be used as such, for example, in powder lacquers, or it may be dissolved in solvents or in a polyisocyanate, including aliphatic polyisocyanates.

When crude phosgenation products of anilineformaldehyde condensates are used as polyisocyanate, the solvent-free method is preferred only if less than about 30%, in particular from 5 to 20%, of the polyisocyanate is sulphonated and reacted with oxiranes or oxetanes since both sulphonization and esterification, which is generally followed by urethane formation, are accompanied by a considerable increase in viscosity.

If a relatively high degree of sulphonation is to be achieved, it is also advisable to use an inert solvent or to carry out the sulphonation reaction immediately after phosgenation and before the solvent used for phosgenation is distilled off.

When reacting isocyanato aryl sulphonic acids with oxiranes or oxetanes, it is necessary to ensure that the first stage of the reaction, (i.e. ring-opening of the heterocyclic compound with esterification), proceeds very rapidly and, in the case of oxiranes, virtually instantly. The second reaction step, (i.e. reaction of the resulting OH-group with isocyanate groups present), proceeds much more slowly, particularly in the case of most oxiranes. Consequently, when mono-oxiranes or oxetanes are used, the viscosity rises only slowly and the second stage of the reaction is accelerated by employing elevated temperatures and/or catalysts, for example organometallic compounds, such as tin dioctoate or dibutyl tin dilaurate.

If, on the other hand, bi- or poly-functional oxiranes are used, a very high increase in viscosity or even complete gelling sets in virtually immediately. Bi- and polyfunctional oxiranes and oxetanes are therefore generally only used in minor quantities either with addition of appropriate monofunctional oxiranes or oxetanes, or when the degree of sulphonation is less than 30%.

As mentioned above, the process according to the present invention generally gives rise to modified polyisocyanates containing free isocyanate groups and urethane groups, which polyisocyanates may be further reacted to the corresponding compounds containing allophanate groups. In the absence of catalysts capable of accelerating such allophanate formation, however, this secondary reaction (third stage of the process according to the present invention) may not be observed or only to a very minor extent unless the products obtained according to the present invention are heated for a relatively long time at elevated temperatures, i.e. temperatures above 100° C. However, allophanate formation may definitely be desirable for increasing the isocyanate functionality. In such a case, it is advisable to use catalysts which accelerate the formation of allophanates from urethane groups and isocyanate groups, for example catalysts of the type described in German Offenlegungsschrift No. 2,040,645 or U.S. Pat. No. 3,769,318. Zinc acetyl acetonate is a typical example of such a catalyst.

The products obtained by the process according to the present invention are valuable starting materials for the production of polyurethane resins by the isocyanate polyaddition process. They are suitable, for example, for the manufacture of compact or cellular elastomers, soft foams, semi-rigid foams and rigid foams, particularly where high standards of density of cross-linking, fire resistant characteristics and degradation characteristics are required. The polyisocyanates according to the present invention are therefore suitable, for example, for the manufacture of padding or cushioning materials, mattresses, elastic underlays, motorcar seats, damping materials, shock absorbers, constructional materials, sound damping insulations, moisture absorbent materials, for example for use in the surgical field, for the manufacture of plant substrates and for insulation against heat and cold. The polyisocyanates according to the present invention are particularly suitable for the manufacture of inorganic-organic plastics, for example via the processes described in German Pat. No. 2,310,559 and German Offenlegungsschriften Nos. 2,227,147 and 2,359,608 and for surface coatings, impregnations and bonds. Aqueous emulsions may be prepared by dispersing the polyisocyanates according to the present invention in water, optionally in the presence of bases.

The following isocyanatoaryl sulphonic acids were used in Examples 1 to 7, (all percentages are percentages, by weight).

Sulphonated Polyisocyanate I 2000 g of a mixture of 60% of 2,4-diisocyanato diphenyl methane and 40% of 4,4'-diisocyanato diphenyl methane were gasified with a mixture of sulphur trioxide and nitrogen at room temperature until 235 g of sulphur trioxide had been taken up. The product had a viscosity of 4000 cP, a sulphur content of 4.1%, corresponding to an $SO_3H$-content of 10.25% and an isocyanate content of 30%.

Sulphonated Polyisocyanate II

This polyisocyanate was prepared in the same manner as in I, but only used 116 g of sulphur trioxide. The product had a viscosity of 100 cP, a sulphur content of 2%, corresponding to an $SO_3H$-content of 5%, and has an isocyanate content of 31.5%.

Sulphonated Polyisocyanate III

The dinuclear content is distilled from the crude phosgenation product of an aniline formaldehyde condensate until the distillation residue has a viscosity of 400 cP at 25° C. The resulting product is sulphonated to a sulphur content of 1,0% by passing a stream of sulphur trioxide/nitrogen mixture over it with stirring. The product had a viscosity of 2200 cP at 25° C., an $SO_3H$-content of 2.5% and an isocyanate-content of 29.1%.

The viscosities given in the Examples were determined at 25° C.

EXAMPLES

EXAMPLE 1

9.25 g (0.1 mol) of epichlorohydrin are stirred into 560 g (approximately 2 mol) of the sulphonated polyisocyanate III at 27° C. The temperature rises to 34° C. and then drops after 6 hours. The viscosity rises from 2200 cP to approximately 5000 cP and falls only slightly in the following days. The viscosity is 8000 cP after 16 days and 17,000 cP after 3 months.

EXAMPLE 2

The procedure is the same as in Example 1, but 18.5 g (0.2 mol) of epichlorohydrin are added. The viscosity at the end of the reaction is approximately 4800 cP. It is 16,000 cP after 16 days and 50,000 cP after 3 months.

EXAMPLE 3

The procedure is the same as in Example 1, but 27.75 g (0.3 mol) of epichlorohydrin are added. The viscosity is approximately 4000 cP at the end of the reaction, 22,000 cP after 16 days and 100,000 cP after 3 months.

EXAMPLE 4

The procedure is the same as in Example 1, but 37 g (0.4 mol) of epichlorohydrin are added. Final viscosity: approximately 3000 cP; after 16 days: 22,000 cP; after 3 months: 180,000 cP. Examples 1 to 4 demonstrate that the presence of excess epoxy groups reduces the stability of the polyisocyanates in storage.

EXAMPLE 5

5.1 g (0.015 mol) of bisphenol-A-bis-glycidyl ether (liquid) are stirred into 560 g (approximately 2 mol) of the sulphonated polyisocyanate III. The temperature rises from 30° C. to 33.5° C. and drops again after 2 hours. Final viscosity: 7000 cP; after 14 days: 8500 cP; after 3 months: 16,000 cP.

EXAMPLE 6

The procedure is the same as in Example 5, but 6.8 g (0.02 mol) of the bis-epoxide are added. The temperature rises to 36° C. Final viscosity: 8000 cP; after 14 days: 9500 cP; after 3 months: 22,000 cP.

EXAMPLE 7

The procedure is the same as in Example 5, but 13.4 g (0.04 mol) of the bis-epoxide are added. Final viscosity: 35,000 cP; after 14 days: 93,000 cP; after 3 months: 110,000 cP.

EXAMPLE 8

26 g of the uretdione of diisocyanato toluene sulphonic acid (prepared from tolylene diisocyanate, isomeric mixture 2,4:2,6=80:20) moistened with toluene, corresponding to 20 g of the dry substance, are suspended in 50 g of toluene. 7.5 g of epichlorohydrin are introduced into the finely divided suspension at 60° C. in the course of 10 minutes with stirring. Stirring is continued for a further 2 hours at 60° C., during which time the suspended isocyanate progressively goes into solution. A small quantity of resinous precipitate and an almost clear solution have formed by the end of the reaction.

The solution contains 29 g of a solid, resinous isocyanatoaryl-sulphonic acid-urethane alkyl ester. When applied from the solution in toluene, the isocyanate is film-forming. When mixed with a polypropylene glycol ether having an OH number of 112, it forms a clear, scratch-resistant coating which has excellent adherence to its substrate. 1,2-butene oxide may be used instead of epichlorohydrin, if desired.

EXAMPLE 9

174 g of tolylene diisocyanate (mixture of isomers 2,4:2,6=80:20) in 300 g of anhydrous chlorobenzene are reacted with 80 g of sulphur trioxide for about 2 hours at from 23° to 30° C. A finely divided suspension of dimeric tolylene diisocyanate monosulphonic acid is formed. The sulphur trioxide is obtained by liberation from warm, 65% oleum with a gentle stream of nitrogen and introduced as gaseous $SO_3$ diluted with nitrogen into the solution of isocyanate. 92.5 g of epichlorohydrin are added to the resulting suspension in the course of 20 minutes at 60° C. Stirring is then continued at 60° C. until (after about 2 hours) a clear solution is obtained.

On removal of the solvent by distillation, the solution yields 343 g of a solid, resinous isocyanatoarylsulphonic acid-urethane alkyl ester. The product is soluble in tetrahydrofuran. When mixed with butane-1,4-diol, the solution forms clear, scratch-resistant coatings which have excellent adherence to their substrate.

EXAMPLE 10

522 g of tolylene diisocyanate (mixture of isomers 2,4:2,6=80:20) are reacted with 80 g of sulphur trioxide for about 2 hours at from 23° to 30° C. A viscous suspension of dimeric tolylene diisocyanato-monosulphonic acid in tolylene diisocyanate is formed.

92.5 g of epichlorohydrin are added to the resulting suspension in the course of 30 minutes at 60° C. A clear solution is obtained in the course of 1 hour's stirring at 60° C. This solution of isocyanatoaryl sulphonic acid urethane alkyl ester in tolylene diisocyanate may be used, for example, instead of tolylene diisocyanate for the production of flexible, elastic foams. The products obtained have a higher cross-linking density, firmer adherence to their substrate and better fire characteristics.

When excess tolylene diisocyanate is distilled from this solution, an amber-colored resin is obtained which is soluble in tetrahydrofuran and in halogenated hydrocarbons, as well as in ester and ketones and suitable for the production of both hard and soft coatings having good adherence properties.

EXAMPLE 11

9.25 g of epichlorohydrin are stirred into 560 g of sulphonated polyisocyanate II. The temperature rises from 28° C. to 32° C. The viscosity is 130 cP after 1 day and 260 cP after 3 months.

EXAMPLE 12

The procedure is the same as in Example 11, but 18.5 g of epichlorohydrin are added. The viscosity is 170 cP after 1 day, 750 cP after 1 month and thereafter remains constant.

EXAMPLE 13

The procedure is the same as in Example 11, but 27.8 g of epichlorohydrin are added. The viscosity is 1100 cP after 1 month and 1200 cP after 3 months.

EXAMPLE 14

The procedure is the same as in Example 11, but 37 g of epichlorohydrin are added. The viscosity is 1150 cP after 1 month and 7000 cP after 3 months, (influence of free epichlorohydrin).

EXAMPLE 15

The procedure is the same as in Example 11, but 46.2 g of epichlorohydrin are added. The viscosity is 80 cP after 1 day, 900 cP after 1 month and 7000 cP after 3 months.

EXAMPLE 16

10 g of 100% sulphuric acid are added dropwise to 100 g of 2,4-diisocyanato toluene over a period of 30 minutes with stirring. Formation of a coarse precipitate of the sulphonated isocyanate containing uretdione and urea groups is accompanied by a rise in temperature and evolution of $CO_2$.

18.5 g of epichlorohydrin are added dropwise to the resulting coarse suspension at room temperature and the temperature is then raised to 80° C. A very finely divided dispersion is first formed, which subsequently changes into a clear, viscous solution. A viscous, green fluorescent solution of the isocyanatoaryl biuret sulphonic acid urethane alkyl ester in excess tolylene diisocyanate is obtained.

The solution hardens in air to a clear, hydrophobic, scratch-resistant coating. Hardening is accelerated by the addition of polyols.

EXAMPLE 17

The procedure is the same as in Example 16, but with the addition of 15 g of sulphuric acid and 20.8 g of epichlorohydrin. A hard resin is obtained which is soluble, for example in chloroform, and forms hard, clear, scratch-resistant films which adhere firmly to glass.

EXAMPLE 18

The procedure is the same as in Example 16, but 23.2 g of 3-ethyl-3-hydroxymethyl-oxetane are used instead of epichlorohydrin.

A slightly cloudy, soft resin is obtained which is soluble in organic solvents and gives rise to hard, clear, firmly adhering coatings.

EXAMPLE 19

Diisocyanato diphenyl methane is distilled off the crude phosgenation product of aniline/formaldehyde condensate until the distillation residue has a viscosity of 100 cP at 25° C. (dinuclear content: 60%, by weight; trinuclear content: 21%, by weight; proportion of higher nuclear polyisocyanates: 19%, by weight).

50 g of concentrated (96%) sulphuric acid are added dropwise to 1 kg of this polyisocyanate mixture at room temperature. A slight rise in temperature and evolution of $CO_2$ accompany the formation of a partly dissolved partly coarsely suspended sulphonation product containing urea groups. 60 g of epichlorohydrin are added and the mixture is heated to 90° C. for 7 hours to complete the reaction. A viscous, only slightly cloudy solution of the isocyanatoaryl biuret sulphonic acid urethane alkyl ester in the isocyanates used as starting material is obtained.

EXAMPLE 20

The procedure is the same as in Example 19, but the sulphuric acid is dissolved in 100 g of tris-chloroethyl phosphate. A clear solution of the sulphonation product is obtained. Heating is not necessary after the addition of epichlorohydrin.

EXAMPLE 21

26 g of the uretdione of diisocyanato toluene sulphonic acid (prepared from tolylene diisocyanate, mixture of isomers 2,4:2,6=80:20) moistened with toluene, corresponding to 20 g of the dry substance, are suspended in 50 g of chlorobenzene. 5 g of 1,6-diisocyanato hexane and 7 g of propylene oxide are added dropwise to the finely divided suspension with stirring at room temperature. A clear solution is obtained after 1 hour's stirring. Removal of the chlorobenzene by distillation leaves a light colored resin (31.3 g) which is soluble in chloroform and glycol monomethyl ether acetate.

When applied to glass plates, the solution forms light, clear, hard and firmly adhering films.

EXAMPLE 22

150 g of the polyisocyanate modified with sulphonic acid ester groups obtained according to Example 1 are mixed with 20 g of trichlorofluoromethane. A mixture of 150 g of 44% sodium water glass ($Na_2O:SiO_2 = 1:2$) and 1.5 g of triethylamine is added in one shot. The mixture foams and forms a hard, compression resistant inorganic-organic foam having a unit weight of 230.

When the foam is flamed with the flame from a bunsen burner, it is found to be self-extinguishing. The properties of the foam are similar to those of a foam obtained from a sulphonated polyisocyanate as described in German Offenlegungsschrift No. 2,227,147, but the polyisocyanate used is hydrophobic, less sensitive to moisture and free from an odor of $SO_2$.

A similar result is obtained using the polyisocyanate from Example 2.

The equivalent ratios of isocyanate groups to sulphonic acid groups and of oxirane or oxetane to sulphonic acid groups used in Examples 1 to 21 are summarized in the Table below:

| Example No. | $\dfrac{NCO}{SO_3H}$ | $\dfrac{Oxirane\ (Oxetane)}{SO_3H}$ |
| --- | --- | --- |
| 1 | 22 | 0.55 |
| 2 | 22 | 1.1 |
| 3 | 22 | 1.67 |
| 4 | 22 | 2.2 |
| 5 | 22 | 0.17 |
| 6 | 22 | 0.22 |
| 7 | 22 | 0.44 |
| 8 | 2 | 1.03 |
| 9 | 2 | 1.0 |
| 10 | 6 | 1.0 |
| 11 | 12 | 0.28 |
| 12 | 12 | 0.56 |
| 13 | 12 | 0.84 |
| 14 | 12 | 1.12 |
| 15 | 12 | 1.4 |
| 16 | 9.4 | 2.0 |
| 17 | 5.6 | 1.5 |
| 18 | 9.4 | 2.0 |
| 19 | 12 | 1.3 |
| 20 | 12 | 1.3 |
| 21 | 2.75 | 1.5 |

What is claimed is:

1. A process for the preparation of modified polyisocyanates containing sulphonic acid alkyl ester groups, which may contain the isocyanate groups at least partly in dimerized form, characterized in that isocyanatoaryl sulphonic acids which contain at least two isocyanate groups and in which the isocyanate groups may be at least partly in dimerized form, are reacted with oxiranes and/or oxetanes at temperatures of from 0° to 190° C., the nature and proportions of the reactants being chosen so that the equivalent ratio of the total quantity of isocyanate groups, including the isocyanate groups which may be present in dimerized form, to the quantity of sulphonic acid groups is greater than 1 and the equivalent ratio of oxirane and/or oxetane groups to sulphonic acid groups is from 0.1:1 to 10:1.

2. The process of claim 1, wherein the aromatic polyisocyanates containing sulphonic acid ester groups are prepared by sulphonating aromatic polyisocyanates in known manner in a first reaction step and the polyisocyanate mixture obtained from this sulphonation, which mixture consists at least partly of isocyanatoaryl sulphonic acids, is reacted with oxiranes and/or oxetanes without being first isolated or purified.

3. The process of claim 1, wherein mono- and/or poly-isocyanates which are free from sulphonic acid groups are included in the reaction mixture.

4. The process of claim 1, wherein the equivalent ratio of isocyanate groups to sulphonic acid groups is from 1.05:1 to 50:1.

5. The process of claim 4, wherein the equivalent ratio of isocyanate groups to sulphonic acid groups is from 2:1 to 30:1.

6. The process of claim 4, wherein the equivalent ratio of oxirane and/or oxetane groups to sulphonic acid groups is from 0.6:1 to 2:1.

7. The process of claim 6, wherein the reaction is conducted at a temperature of from 20° to 140° C.

8. Polyisocyanate mixtures characterized as containing:
(a) from about 4 to about 48%, by weight, of isocyanate groups, which may be partly in dimerized form;
(b) from about 0.3 to about 38%, by weight, of groups of the formula +SO₂—O+ forming part of an aryl sulphonic acid alkyl ester group;
(c) from 0 to about 36%, by weight, of SO₃H groups;
(d) from 0 to about 25%, by weight, of urethane groups +NH—CO—O+; and
(e) from 0 to about 28%, by weight, of allophanate groups

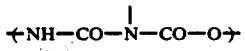

the groups mentioned under (d) and (e) together amounting to from at least 0.4%, by weight, to not more than 28%, by weight, and the groups mentioned under (b) and (c) together amounting to not more than 38%, by weight.

9. The mixtures of claim 8, wherein:

Component (a) comprises from about 10 to about 40% by weight;
Component (b) comprises from about 0.6 to about 28% by weight;
Component (c) comprises from 0 to about 10% by weight;
Component (d) comprises from about 0.2 to about 20% by weight; and
Component (e) comprises from about 0.2 to about 20% by weight.

10. In the production of oligomeric or polymeric polyaddition products comprising reacting organic polyisocyanates with active hydrogen containing materials, the improvement wherein said polyisocyanate comprises
(a) from about 4 to about 48%, by weight, of isocyanate groups, which may be partly in dimerized form;
(b) from about 0.3 to about 38%, by weight, of groups of the formula +SO₂—O+ forming part of an aryl sulphonic acid alkyl ester group;
(c) from 0 to about 36%, by weight, of SO₃H groups;
(d) from 0 to about 25%, by weight, of urethane groups +NH—CO—O+; and
(e) from 0 to about 28%, by weight, of allophanate groups

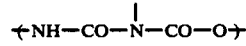

the groups mentioned under (d) and (e) together amounting to from at least 0.4%, by weight, to not more than 28%, by weight, and the groups mentioned under (b) and (c) together amounting to not more than 38%, by weight.

* * * * *